US012342428B2

(12) United States Patent
Bench et al.

(10) Patent No.: US 12,342,428 B2
(45) Date of Patent: Jun. 24, 2025

(54) PAVER ACCOMPANYING DEVICE AND ASSOCIATED HEATING SYSTEM

(71) Applicant: Heatwave Systems, LLC, Murray, UT (US)

(72) Inventors: Ryan J. Bench, Murray, UT (US); Joseph R. Leyva, West Jordan, UT (US); Scott B. Gwilliam, Taylorsville, UT (US)

(73) Assignee: HEATWAVE SYSTEMS, LLC, Murray, UT (US)

( * ) Notice: Subject to any disclaimer, the term of this patent is extended or adjusted under 35 U.S.C. 154(b) by 977 days.

(21) Appl. No.: 16/871,207

(22) Filed: May 11, 2020

(65) Prior Publication Data

US 2020/0275532 A1 Aug. 27, 2020

Related U.S. Application Data

(63) Continuation of application No. 15/147,634, filed on May 5, 2016, now Pat. No. 10,701,764.

(51) Int. Cl.
*H05B 3/46* (2006.01)
*H05B 1/02* (2006.01)
*H05B 3/56* (2006.01)

(52) U.S. Cl.
CPC ............. *H05B 3/46* (2013.01); *H05B 1/0227* (2013.01); *H05B 3/56* (2013.01)

(58) Field of Classification Search
CPC .......... H05B 1/0227; H05B 3/46; H05B 3/56; H05B 2230/026; E04F 15/02494; E04F 15/02452
USPC .......................................................... 219/213
See application file for complete search history.

(56) References Cited

U.S. PATENT DOCUMENTS 3,095,491 A * 6/1963 Deacon ................. F24D 13/024 392/435
4,281,237 A * 7/1981 Berenson ............... H02H 5/043 219/212
4,326,366 A 4/1982 Werner
(Continued)

FOREIGN PATENT DOCUMENTS

CA 2482519 A1 3/2006
FR 2681753 A1 3/1993
KR 20140110310 A 9/2014

OTHER PUBLICATIONS

Installation instruction, Dec. 2008.

*Primary Examiner* — Ibrahime A Abraham
*Assistant Examiner* — Frederick F Calvetti
(74) *Attorney, Agent, or Firm* — MASCHOFF BRENNAN; Paul G. Johnson

(57) ABSTRACT

The present disclosure may relate to a paver accompanying device that may include a plate with a top face and a bottom face and shaped and configured to accompany a paver proximate the top face of the plate. The paver accompanying device may also include multiple grooves in the top face of the plate that run from a first end of the plate to a second end of the plate. The grooves may also be open at the first end of the plate and at the second end of the plate. Additionally, the grooves may be sized to hold a heat producing cable within the grooves such that the heat producing cable is disposed even with or below the top face of the plate.

20 Claims, 12 Drawing Sheets

(56) References Cited

U.S. PATENT DOCUMENTS

| | | | | |
|---|---|---|---|---|
| 4,576,221 | A * | 3/1986 | Fennesz | F24D 3/14 165/49 |
| 4,591,697 | A * | 5/1986 | Lexer | F24C 7/065 392/412 |
| 4,641,010 | A * | 2/1987 | Abura | A45D 1/18 338/285 |
| 4,852,315 | A * | 8/1989 | Fukayama | F24D 3/14 52/480 |
| 5,363,614 | A | 11/1994 | Faulkner | |
| 6,054,691 | A * | 4/2000 | McGwire | H05B 3/56 219/535 |
| 6,061,982 | A * | 5/2000 | Owen | H02G 3/285 52/220.1 |
| 6,489,594 | B2 * | 12/2002 | Jones | H05B 1/0277 219/213 |
| 6,508,037 | B1 * | 1/2003 | Owen | H02G 3/285 52/220.1 |
| 6,805,298 | B1 | 10/2004 | Corbett | |
| 6,855,884 | B2 * | 2/2005 | Spagnoli | H02G 3/0418 174/100 |
| 6,983,570 | B2 | 1/2006 | Mead | |
| 7,150,131 | B2 * | 12/2006 | Barker | H02G 9/04 52/220.8 |
| 7,832,159 | B1 * | 11/2010 | Kayhart | F24D 3/142 52/220.3 |
| 7,954,287 | B2 * | 6/2011 | Bravo | H02G 3/22 52/220.1 |
| 8,288,689 | B1 * | 10/2012 | Adelman | H05B 3/34 219/213 |
| 8,333,042 | B2 * | 12/2012 | Frederiksen | E04F 17/00 52/177 |
| 8,733,031 | B2 * | 5/2014 | Knight, III | E04F 15/02183 52/126.5 |
| 8,752,346 | B1 * | 6/2014 | Shaw | F24D 3/127 165/56 |
| 8,944,146 | B2 | 2/2015 | Barmore | |
| 9,188,348 | B2 | 11/2015 | Larson | |
| 9,284,693 | B2 | 3/2016 | Tabibnia | |
| 9,416,979 | B2 | 8/2016 | Larson | |
| 9,441,378 | B1 | 9/2016 | Conklin | |
| 9,499,993 | B1 | 11/2016 | Kugler et al. | |
| 10,006,644 | B2 | 6/2018 | Larson | |
| 10,106,991 | B2 | 10/2018 | Dombrowski et al. | |
| 2004/0049998 | A1 * | 3/2004 | Jette | E04F 15/02458 52/220.1 |
| 2005/0284650 | A1 * | 12/2005 | Hull | H02G 3/126 174/58 |
| 2008/0290504 | A1 | 11/2008 | Karavakis et al. | |
| 2009/0026192 | A1 | 1/2009 | Fuhrman | |
| 2009/0199494 | A1 | 8/2009 | Lee et al. | |
| 2009/0230113 | A1 * | 9/2009 | Batori | E04F 15/18 219/213 |
| 2010/0205899 | A1 | 8/2010 | Califano | |
| 2011/0047907 | A1 | 3/2011 | Smolka et al. | |
| 2011/0138723 | A1 | 6/2011 | Repasky | |
| 2012/0298331 | A1 * | 11/2012 | Barmore | F24D 13/02 165/104.11 |
| 2014/0069039 | A1 * | 3/2014 | Schluter | E04F 15/02194 52/390 |
| 2014/0083047 | A1 * | 3/2014 | Kugler | E04G 21/14 52/745.05 |
| 2014/0096763 | A1 * | 4/2014 | Barmore | F24D 3/125 126/714 |
| 2014/0237912 | A1 | 8/2014 | Kugler et al. | |
| 2014/0308076 | A1 | 10/2014 | Tabibnia | |
| 2014/0367477 | A1 * | 12/2014 | Cha | E04F 15/02464 52/126.6 |
| 2015/0184398 | A1 | 7/2015 | Tabibnia | |
| 2015/0252574 | A1 * | 9/2015 | Kugler | E04F 15/02044 52/506.08 |
| 2015/0308126 | A1 | 10/2015 | Kugler et al. | |
| 2016/0010327 | A1 | 1/2016 | Larson | |
| 2016/0040439 | A1 | 2/2016 | Pelc et al. | |
| 2016/0047131 | A1 * | 2/2016 | Larson | E04F 15/185 52/173.1 |
| 2016/0348831 | A1 * | 12/2016 | Dombrowski | E04F 15/02464 |
| 2016/0377300 | A1 * | 12/2016 | Larson | F24D 13/024 219/532 |
| 2017/0152635 | A1 * | 6/2017 | Tabibnia | E04F 15/02482 |
| 2017/0175389 | A1 * | 6/2017 | Liang | E04B 5/48 |
| 2017/0260750 | A1 * | 9/2017 | Essig | E04D 11/005 |
| 2017/0350141 | A1 * | 12/2017 | Kugler | E04F 15/0247 |
| 2018/0299140 | A1 * | 10/2018 | Larson | E04F 15/182 |
| 2018/0327979 | A1 | 11/2018 | Szekely | |
| 2019/0112767 | A1 * | 4/2019 | Logan | H05B 3/56 |
| 2020/0173665 | A1 * | 6/2020 | Nyström | F24D 13/024 |
| 2022/0112729 | A1 * | 4/2022 | Chen | E04F 15/02452 |

* cited by examiner

PAVER ACCOMPANYING DEVICE AND ASSOCIATED HEATING SYSTEM

CROSS-REFERENCE TO RELATED APPLICATIONS

This application is a continuation of U.S. patent application Ser. No. 15/147,634, filed on May 5, 2016; the disclosure of which is incorporated herein by reference in its entirety.

FIELD

The embodiments discussed in the present disclosure relate to a paver accompanying device and associated heating system.

BACKGROUND

Pavers, or paving stones, have been used to create a flat surface that may be usable as a patio, porch, deck, courtyard, terrace, etc. However, when such pavers are outside, particularly in cold environments, ice and/or snow may accumulate on pavers.

The subject matter claimed in the present disclosure is not limited to embodiments that solve any disadvantages or that operate only in environments such as those described above. Rather, this background is only provided to illustrate one example technology area where some embodiments described may be practiced.

SUMMARY

One or more embodiments of the present disclosure may include a paver accompanying device that may include a plate with a top face and a bottom face and shaped and configured to accompany a paver proximate the top face of the plate. The paver accompanying device may also include multiple grooves in the top face of the plate that run from a first end of the plate to a second end of the plate. The grooves may also be open at the first end of the plate and at the second end of the plate. Additionally, the grooves may be sized to hold a heat producing cable within the grooves such that the heat producing cable is disposed even with or below the top face of the plate.

Additionally, one or more embodiments of the present disclosure may include a paver heating system that may include multiple pavers and a heat producing cable disposed beneath the pavers. The paver heating system may additionally include multiple paver accompanying devices. Each of the paver accompanying devices may include a plate shaped and configured to accompany at least a portion of one of the pavers proximate a top face of the plate, and multiple grooves in the top face of the plate. For each of the plates, the grooves may run from a first end of the plate to a second end of the plate and may be open at the first end of the plate and the second end of the plate. Additionally, for each of the plates, the grooves may be sized to hold the heat producing cable within the grooves such that the heat producing cable is disposed even with or below the top face of the plate. The paver heating system may also include multiple pedestals, where each of the paver accompanying devices may be supported by at least two of the pedestals. Additionally, the paver heating system may include multiple brackets that span between at least two of pedestals and may support the paver accompanying devices.

The object and advantages of the present disclosure will be realized and achieved at least by the elements, features, and combinations particularly pointed out in the claims.

It is to be understood that both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to a paver accompanying device and associated heating system. The paver accompanying device may function to maintain a heating component (such as a heat producing cable) in proximity to a paver such that as snowy or icy conditions exist, the snow or ice will melt or even be prevented from forming on the paver. In some embodiments, the paver accompanying device may include a plate with a series of grooves to hold the heating component so that the paver may rest directly on the paver accompanying device. The paver accompanying device may function as a heat sink to draw the heat from the heating component into the paver accompanying device and distribute that heat to the entire paver. In some embodiments, the paver accompanying device may include insulation material underneath a top face of the plate to guide the heat towards the paver. However, heat may still radiate below and/or along the edges of the paver accompanying device to facilitate drainage of melted ice or snow.

Embodiments of the present disclosure are explained with reference to the accompanying drawings.

Figure 1:
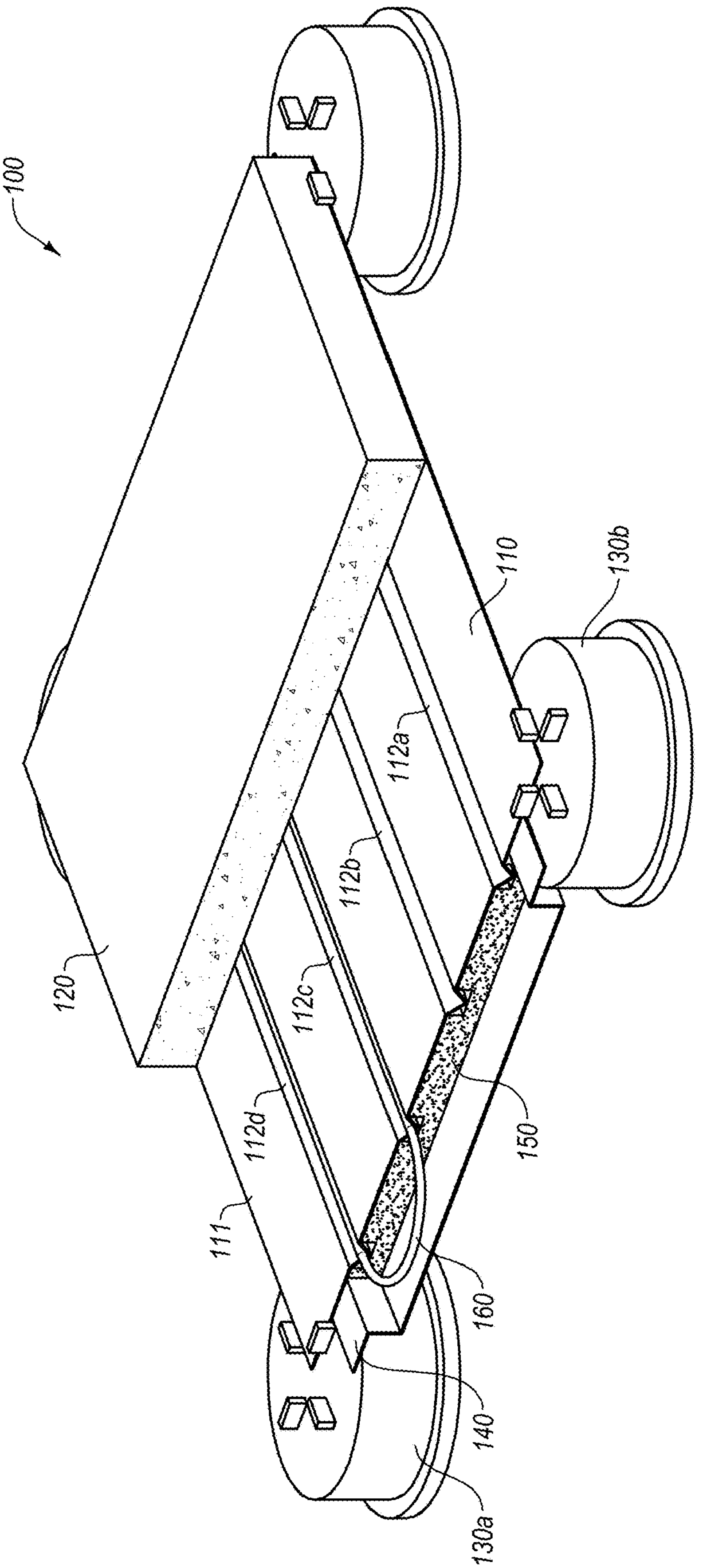
FIG. 1 illustrates a plan view of an example paver heating system.

FIG. 1 illustrates a plan view of an example paver heating system 100, in accordance with one or more embodiments of the present disclosure. The paver heating system 100 may include a paver accompanying device 110 that may accompany a paver 120 or a portion thereof and distribute heat to the paver 120. The term accompany or accompanying, as used in the present disclosure, may include providing structural support, however minimal, or may include being disposed beneath or near, or may include providing some type of benefit, such as heating support, etc. In other words, the term accompanying should be given a broad interpretation. The paver accompanying device 110 may operate to provide a heating component (e.g., a heat producing cable 160 such as a resistance heating cable) proximate the paver 120 by having the heat source disposed in one or more grooves 112 of the paver accompanying device 110. The paver accompanying device 110 may also function as a heat sink to draw heat from the heat producing cable 160 and distribute the heat to other portions of the paver 120 that may not be directly adjacent to the heat producing cable 160.

The paver accompanying device 110 may include a plate 111 with the grooves 112. In some embodiments, the paver accompanying device 110 may be a single sheet of common material shaped in a particular way. For example, a single sheet of material forming the plate 111 may be formed to include the grooves 112. The paver accompanying device 110 may be formed of a heat tolerant material, such as aluminum, copper, or other metal, metal alloys, ceramic, silicone, etc., or any combinations thereof. In some embodiments, the material may be selected to be a thermally conductive material such that as the heat producing cable 160 generates heat, the plate 111 may draw and spread that heat throughout the plate 111 In some embodiments, any material may be selected that is capable of being shaped and able to rapidly transfer heat, including plastics or insulation laminated with metal. The grooves 112 may be shaped and/or configured to receive the heat producing cable 160 such that the paver 120 may lay relatively flush with a top face of the paver accompanying device 110 without interference with the heat producing cable 160 as the heat producing cable 160 runs along the grooves 112.

In some embodiments, the top face of the paver accompanying device 110 and the paver 120 may be shaped to provide a high amount of direct contact between the paver accompanying device 110 and the paver 120 to facilitate heat transfer from the paver accompanying device 110 to the paver 120. By having a similar shape, heat may transfer directly from the paver accompanying device 110 into the paver 120 rather than having to pass through air between the paver accompanying device 110 and the paver 120. By way of example, the bottom surface of the paver 120 may have a similar surface to the top face of the plate 111. In these and other embodiments, the bottom surface of the paver 120 may or may not match the grooves 112 of the plate 111.

In some embodiments, the paver accompanying device 110 may have a shape or size that is similar to or the same as the paver 120. For example, the paver accompanying device 110 may be a two foot by two foot square, or a two foot by four foot rectangle to support a comparably sized paver. In some embodiments, the paver accompanying device 110 may have a shape or size that is 5% or 10% smaller in one or more dimensions than the paver 120.

In some embodiments, the paver accompanying device 110 may include insulation material 150 on the bottom face of the plate 111, where the bottom face is opposite the face having the plurality of grooves. In some embodiments, the insulation material 150 may function to direct or focus the heat toward the paver 120 when installed. In some embodiments, the insulation material 150 may insulate the paver accompanying device 110 from the elements. For example, as the heat producing cable 160 generates heat, the paver accompanying device 110 may act as a heat sink and draw some of that heat in to the plate 111. Rather than radiating that heat in all directions, for example, the insulation material 150 may direct a portion of heat radiating out from the plate 111 towards and into the paver 120. The insulation material 150 may include any thermal insulation material, for example, polyurethane or other polymers, mineral wool (e.g., fiberglass or ceramic fiber wool), calcium silicate, gypsum plasters, cellulose, plastic fiber, natural fiber, polystyrene, polyisocyanurate, vermiculite, perlite, urea-formaldehyde, cementitious foam, phenolic foam, etc. In some embodiments, the insulation material 150 itself may adhere to the plate 111. In these and other embodiments, the insulation material may be applied to the plate 111 using a spraying technique or other application process (e.g., spraying on polyurethane foam). Additionally or alternatively, the insulation material 150 may be adhered to the plate 111 using a heat tolerant adhesive such as a glue, epoxy, double-sided tape, etc. Additionally or alternatively, the plate 111 may be laminated to the insulation material 150.

The paver 120 may include any device, component, material, or block of material that may be used as a surface for an area. For example, the paver 120 may include brick, stone, tile, slate, ceramics, composites, etc. The paver 120 may take any shape or form, such as square, rectangular, circular, etc. In these and other embodiments, the paver 120, or a combination of pavers may create a repeating pattern such as a tessellation.

In some embodiments, the paver heating system 100 may additionally include pedestals 130 (e.g., pedestals 130*a* and 130*b*) upon which the paver accompanying device 110 and/or the paver 120 may rest. The pedestals 130 may support a portion of the weight of the paver 120. In some embodiments, the pedestals 130 may provide a mechanism to provide a level surface for the paver 120. For example, the pedestals 130 may support the paver 120 such that the paver 120 is above the ground and/or the pedestals 130 may be height-adjustable such that if the pedestals 130 are uneven, the height of a given pedestal (e.g., the pedestal 130*a*) may be adjusted to level out the paver 120. The pedestals 130 may include guides or other features to facilitate placing the paver 120 in a desired orientation, such as aligned with other pavers. In some embodiments, the pedestals 130 may be permanently affixed to the ground, or may be a movable component placed on top of the ground. As used in the present disclosure, the term ground may refer to the surface above which the paver 120 is disposed, and may include earth, a building, patio, deck, roofing membrane, roofing material, concrete, etc. (e.g., the ground may refer to a surface at ground level or may refer to a surface such as a terrace at the top of a building or a balcony several floors up upon which the paver 120 is disposed). Furthermore, some environments require a small profile system, such as on rooftop terraces or on balconies. In these and other embodiments, an entire depth of a heating system (without the paver 120) may be limited to less than 1.5 inches, less than one inch, less than 0.75 inches, or less than 0.5 inches.

In some embodiments, the groove 112*d* of the paver accompanying device 110 may be positioned such that a corner of the paver accompanying device 110 may cover approximately one fourth of the pedestal 130*a* without interference between the groove 112*d* and the pedestal 130*a*. In these and other embodiments, the pedestals 130 may be symmetrical about one plane or two intersecting planes such that the pedestals 130 may support multiple paver accompanying devices and/or pavers in a generally uniform manner. For example, the pedestal 130*a* may be symmetrical about two intersecting planes generally perpendicular to the edges of the paver accompanying device 110 and perpendicular to the top face of the plate 111, such that four adjacent paver accompanying devices may each rest upon the pedestal 130*a*. In these and other embodiments, the pedestals 130 may take a generally cylindrical or rectangular prism form.

In some embodiments, the paver heating system 100 may include a bracket 140 spanning between the pedestals 130*a* and 130*b*. The bracket 140 may be formed of a single piece of material and shaped to rest on the pedestals 130*a* and 130*b* while providing support to the paver accompanying device 110 (for example, by providing support to the insulation material 150). The bracket 140 may be formed of a heat tolerant material, such as aluminum, copper, or other metal, metal alloys, ceramic, silicone, etc., or any combinations thereof. In some embodiments, any material may be selected that is capable of being shaped and able to rapidly transfer heat, including plastics or insulation laminated with metal. In some embodiments, the bracket 140 may operate as a smaller heat sink to draw a small portion of the heat down below insulation material 150 to facilitate drainage of already melted ice or snow or the free flow of melted ice or snow along the ground out from underneath the paver 120.

In some embodiments, the bracket 140 may serve as a spacing device when assembling the paver heating system 100. For example, the bracket 140 may be sized to span between the pedestals 130*a* and 130*b* at a distance that provides for the paver 120 and/or the paver accompanying device 110 to cover approximately one fourth to approximately one half of the top of each of the pedestals 130*a* and 130*b*. Additionally or alternatively, the bracket 140 may be sized and/or positioned to undergird a single paver 120 and/or a single paver accompanying device 110.

Figure 3A:
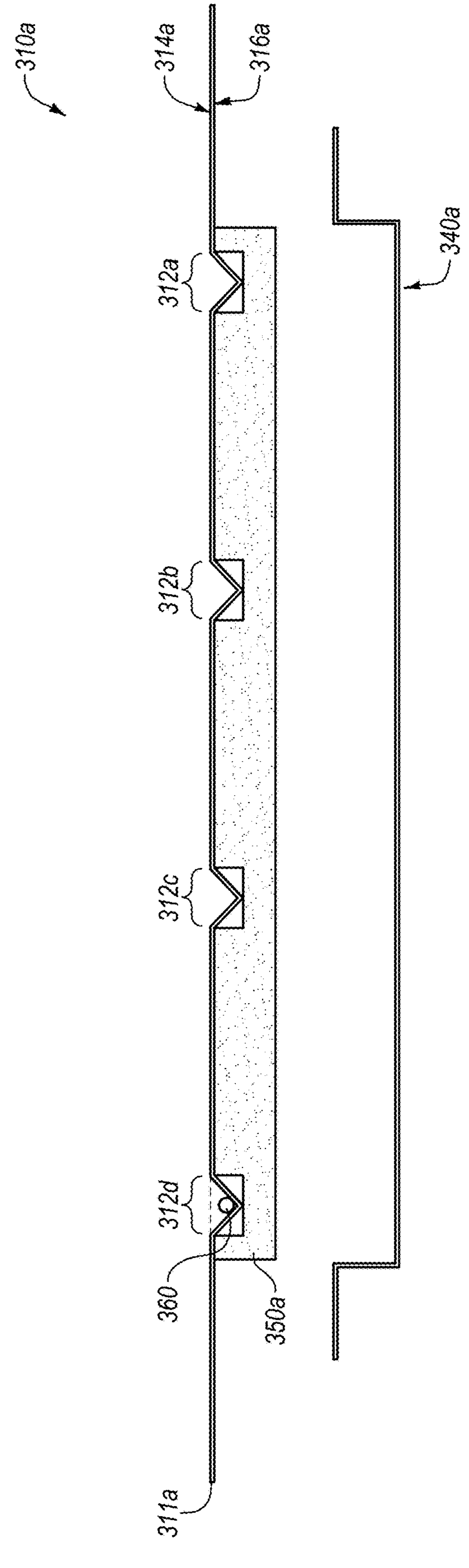
FIG. 3A illustrates an example paver accompanying device and an example bracket.
Figure 3B:
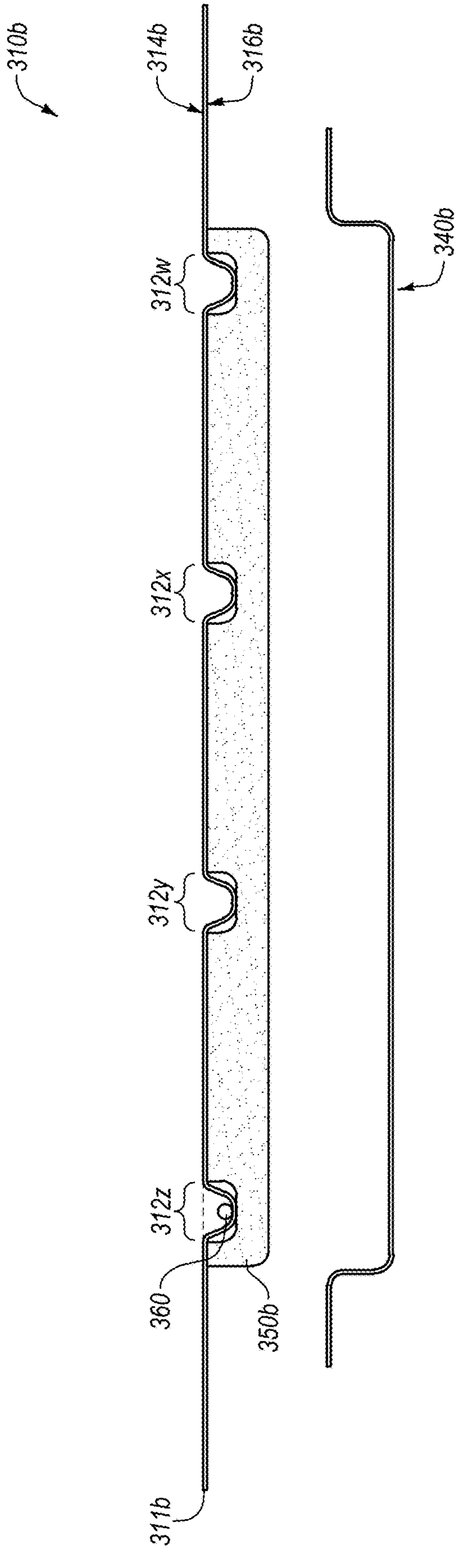
FIG. 3B illustrates another example paver accompanying device and another example bracket.

In some embodiments, the bracket 140 may be shaped and/or sized to match the bottom surface of the insulation material 150. For example, the insulation material 150 may have a squared off shape, and the bracket 140 may be shaped to be the same size or slightly larger than the insulation material 150 but with a similar shape such that the bracket 140 may support the insulation material 150. As another example, describing the shape of the bracket 140 starting from the pedestal 130*a*, a first portion of the bracket may rest upon the pedestal 130*a* and may be approximately parallel with the plate 111. After the edge of the pedestal 130*a*, the bracket 140 may turn (e.g., approximately ninety degrees) and proceed along a second portion away from the plate 111. The second portion may proceed approximately the depth of the grooves 112 and the insulation material 150 combined, and may then turn to proceed along a third portion (e.g., turn approximately ninety degrees or such that the first two turns approximate one hundred and eighty degrees together such that the third portion is again approximately parallel with the plate 111). The third portion may proceed approximately to the pedestal 130*b* supporting the insulation material 150 and/or the paver accompanying device 110 along the third portion. Proximate the pedestal 130*b*, the bracket 140 may turn again (e.g., approximately ninety degrees) back towards the plate 111 and may proceed along a fourth portion. The fourth portion may proceed approximately to the plate 111, and may turn to proceed along a fifth portion (e.g., turn approximately ninety degrees or such that the last two turns are approximately one hundred and eighty degrees or such that the fifth portion is approximately parallel with the plate 111). The fifth portion may proceed along and rest upon the pedestal 130*b*. While illustrated as ninety degree turns, in some embodiments the various turns may be at different angles or curvatures (for example, as illustrated in FIGS. 3A and 3B).

The heat producing cable 160 may include any device or system configured to generate heat. In some embodiments, the heat producing cable 160 may include a resistance heating cable (including parallel or series), such as, for example, a HOTT-WIRE® device. In these and other embodiments, the heat producing cable 160 may include a resistive element that may generate heat as current flows through the resistive element, such as nichrome (an alloy of nickel and chromium and possibly other materials such as iron), cupronickel (an alloy of nickel and copper), iron-chromium-aluminum alloys, copper, bronze, etc. The heat producing cable 160 may additionally include an insulator around the resistive element (e.g., a fiberglass or other mineral-based insulation, a polymer-based insulation, fluoropolymer, polyvinyl chloride (PVC), polyolefin, polyethylene, etc.), a metallic tube enclosing the insulator, and/or a protective jacket around the metallic tube. In some embodiments, the heat producing cable 160 may include multiple resistive elements running in parallel along the length of the heat producing cable 160. In some embodiments, the heat producing cable 160 may be between approximately one fourth of an inch and approximately one half of an inch (including one tenth of an inch to seven tenths of an inch). The heat producing cable 160 may or may not be symmetrical (e.g., the heat producing cable may have a generally circular cross-section, or a rectangular cross section, etc.).

The heat producing cable 160 may be a modular cable or may be a particular length for a particular use. For example, the heat producing cable 160 may be a standard length with connectors at each end such that a series of the heat producing cables 160 may be strung together to reach a desired length. Additionally or alternatively, the heat producing cable 160 may be custom or special made to fit the length of a particular setting. In these and other embodiments, the heat producing cable 160 may be coupled to an operation control logic device that may measure when to turn on or turn off the heat producing cable 160 based on factors such as ambient temperature, ground temperature, humidity, precipitation, barometric pressure, changes in barometric pressure, weather forecasts, etc., or combinations thereof. For example, when the ambient temperature drops below a threshold temperature (e.g., 40° F.), the heat producing cable 160 may be turned on. As another example, the control logic may receive data from a 3$^{rd}$ party weather service and may turn on the heat producing cable 160 when the temperature is forecasted to be below a threshold temperature and/or when snow/ice/sleet is forecasted. As an additional example, the control logic may monitor for a combination of low temperature and variation in barometric pressure and may turn on the heat producing cable 160 accordingly.

In some embodiments, the heat producing cable 160 may include a tube for carrying heated water or other fluid. However, such an embodiment may have limited utility because of the increased size required in using tubing with a sufficient diameter to allow sufficient fluid flow to radiate enough heat to melt snow and/or ice off of the paver 120. For example, using fluid flow may require tubes of a much larger diameter than that of a resistive element to generate the same amount of heat. Furthermore, the heat dissipates much more from a fluid tube than in a resistive heating element, limiting the size of area that a fluid tube system can treat. Following the example, the grooves 112 of the paver accompanying device 110 may be over one inch below the top face of the plate 111 for a fluid flow tube to remain below the top face of the plate 111, while the grooves 112 of the paver accompanying device 110 may be one half of an inch or smaller below the top face of the plate 111 for a resistive element. By using fluid flow with larger grooves 112, the surface area contact between the paver accompanying device 110 and the paver 120 may be less than for resistive heating elements with smaller grooves 112. Having less surface area contact may decrease the amount and/or efficiency of heat flow from the paver accompanying device 110 to the paver 120.

Modifications, additions, or omissions may be made to FIG. 1 without departing from the scope of the present disclosure. For example, the paver heating system 100 may include more or fewer elements than those illustrated or described in the present disclosure. For example, the paver heating system 100 may include additional paver accompanying devices 110, pavers 120, pedestals 130, brackets 140, and/or hear producing cables 160. As another example, the pedestals 130 may be positioned or numbered in any manner suitable for supporting the pavers 120 and/or the paver accompanying devices 110.

FIGS. 2A-2F illustrate an example of assembling an example paver heating system 200, including pedestals 230 (FIG. 2A), brackets 240 (FIG. 2B), paver accompanying devices 210 (FIG. 2C), a heat producing cable 260 (FIG. 2D), and pavers 220 (FIGS. 2E and 2F), in accordance with one or more embodiments of the present disclosure.

Figure 2A:
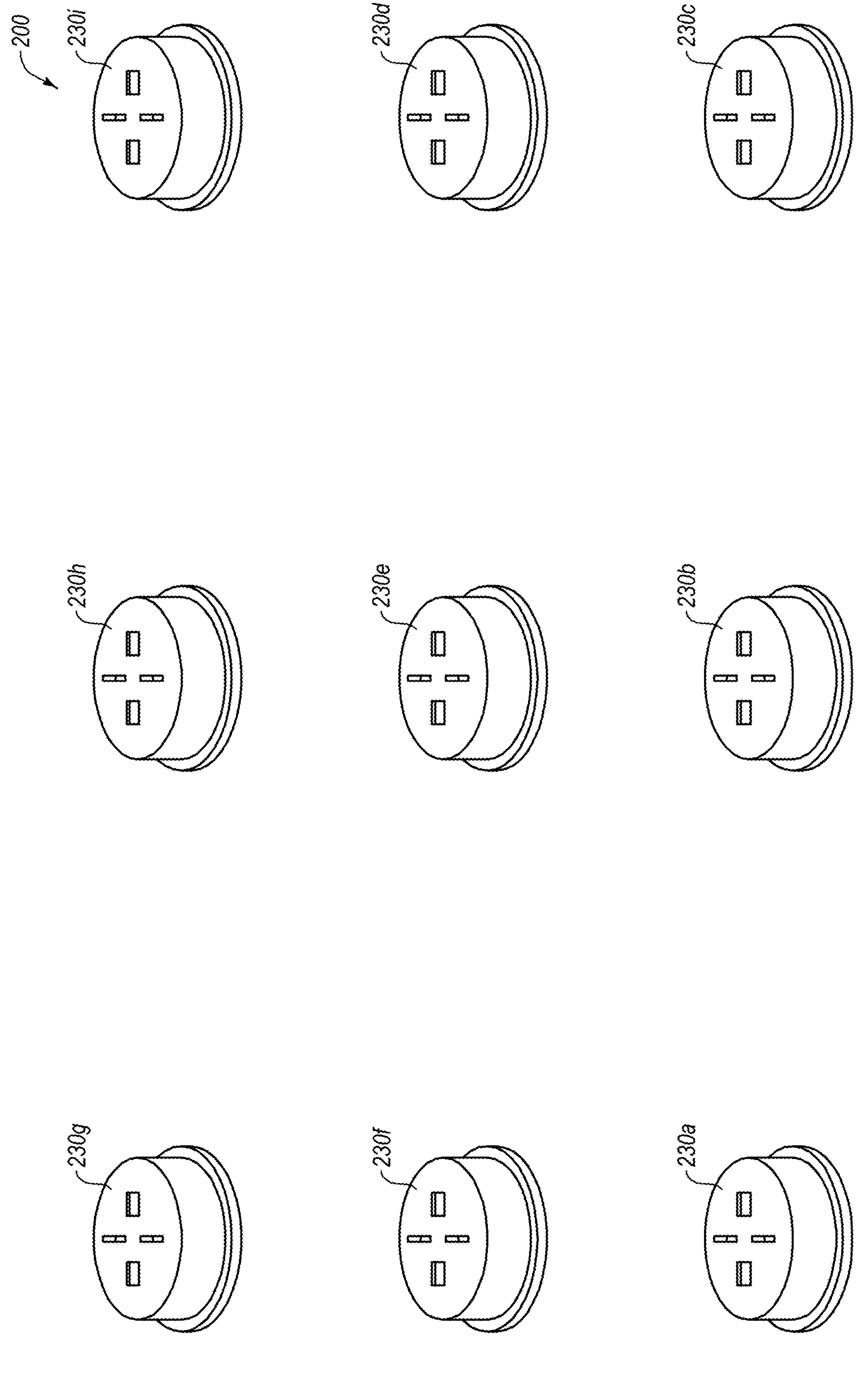
FIGS. 2A-2F illustrates an example of assembling an example paver heating system, including pedestals (FIG. 2A), brackets (FIG. 2B), paver accompanying devices (FIG. 2C), a heat producing cable (FIG. 2D), and pavers (FIGS. 2E and 2F)

As illustrated in FIG. 2A, when assembling the paver heating system 200, a series of pedestals 230 (e.g., the pedestals 230*a*-230*i*) may be placed in a particular orientation and pattern to support one or more additional components of the paver heating system 200. For example, the pedestals 230 may be positioned such that each corner of the paver accompanying devices 210 and/or the pavers 220 may be supported by one or more of the pedestals 230. Additionally or alternatively, the pedestals 230 may be positioned such that the paver accompanying devices 210 and/or the pavers 220 may be supported by additional pedestals 230, such as between the corners or in the middle.

Figure 2B:
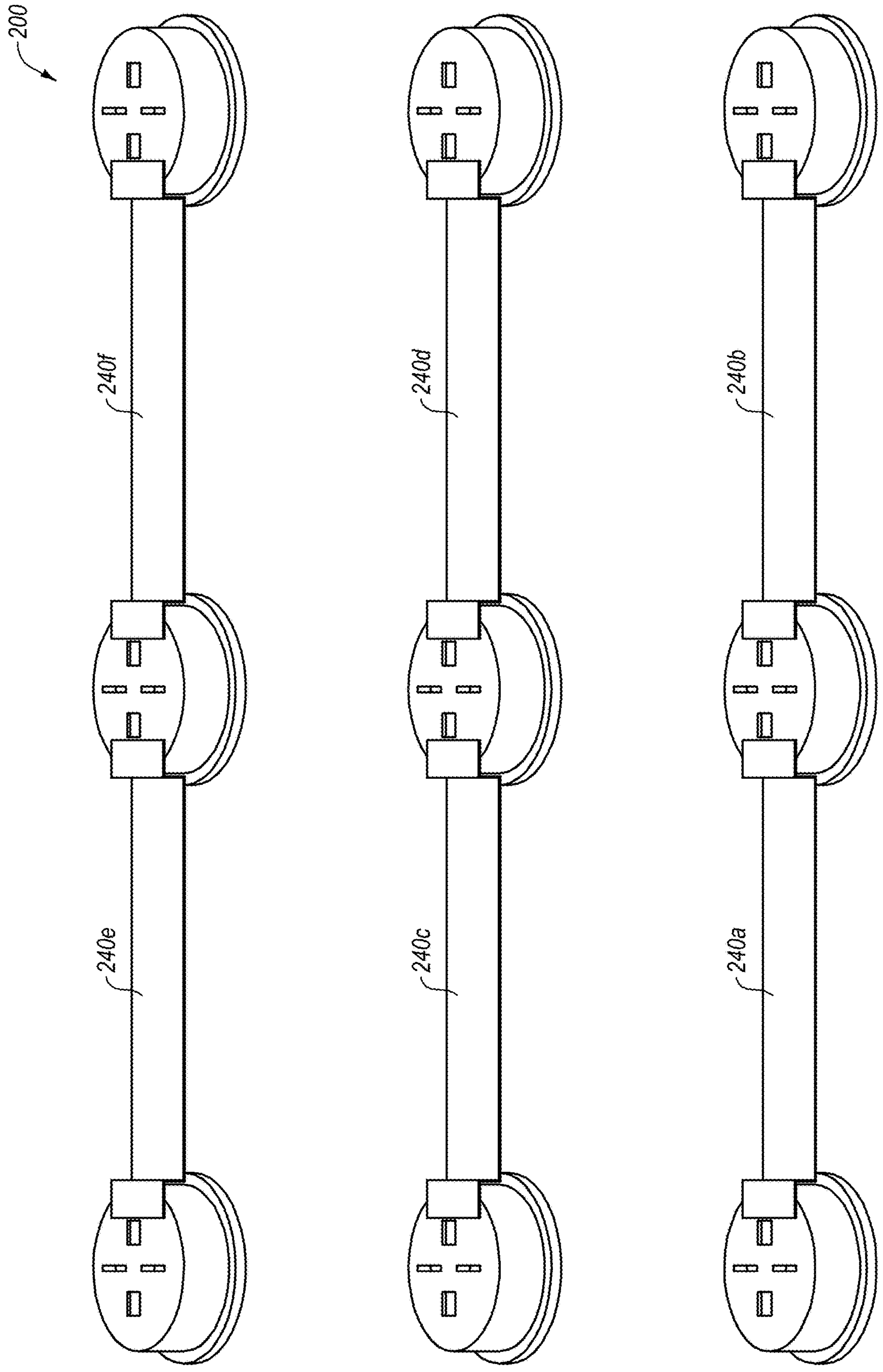

As illustrated in FIG. 2B, when assembling the paver heating system 200, a series of brackets 240 (e.g., the brackets 240*a*-240*f*) may be suspended between the pedestals 230. For example, the brackets 240 may be disposed between two adjacent pedestals 230 in a first direction that may be perpendicular to a second direction in which the heat producing cable 260 may run. Additionally or alternatively, the brackets 240 may be disposed in both the first direction and the second direction, in only the second direction, or in any other direction (e.g., spanning diagonally).

Figure 2C:
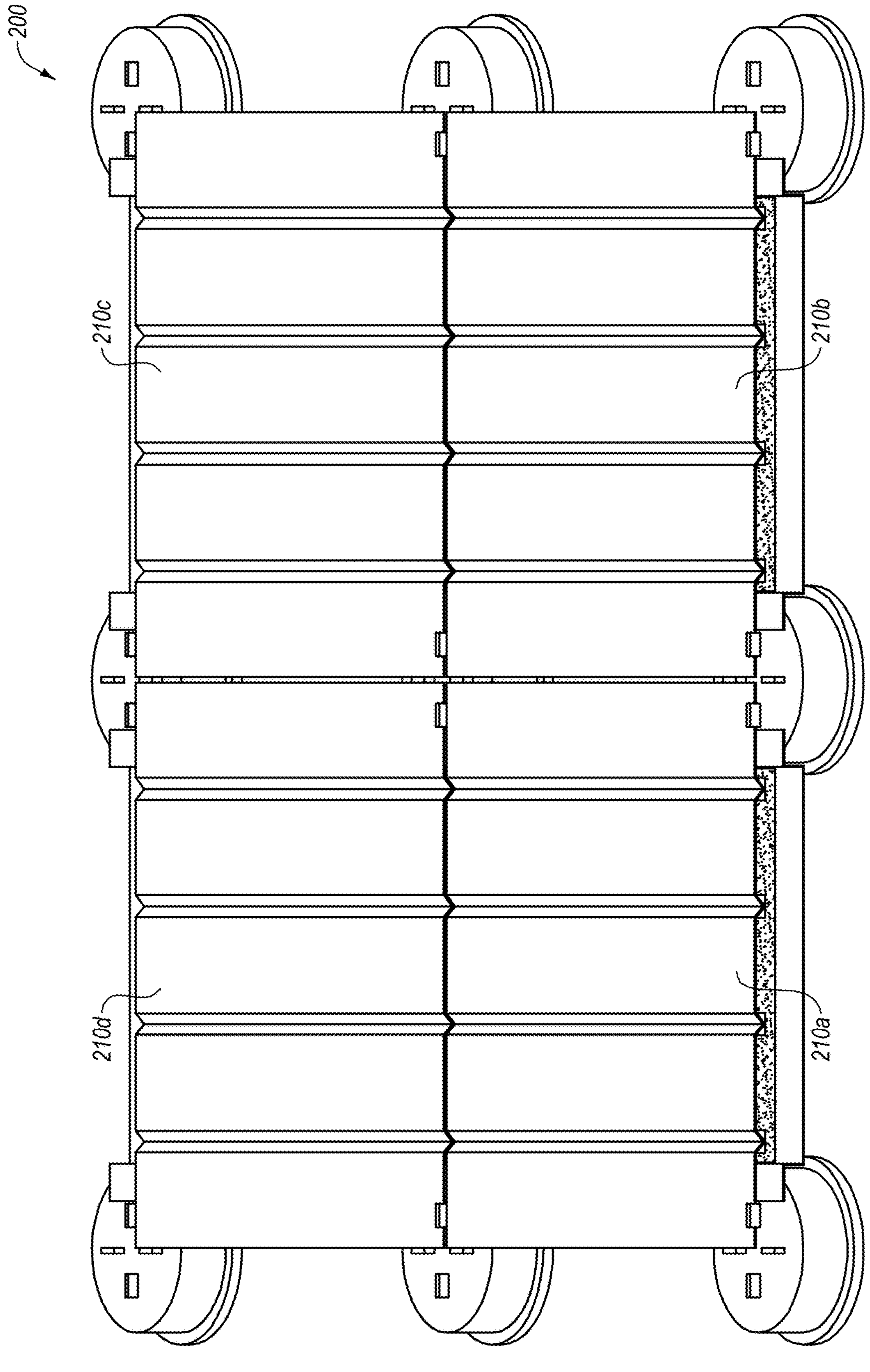

As illustrated in FIG. 2C, when assembling the paver heating system 200, a series of paver accompanying devices 210 (e.g., the paver accompanying devices 210*a*-210*d*) may be placed on top of the brackets 240 and/or the pedestals 230. The pedestals 230 may include a feature to guide the placement of the paver accompanying devices 210. In some embodiments, the paver accompanying devices 210 may be aligned such that the grooves of one paver accompanying device lead into the grooves of the next paver accompanying device. For example, the grooves of the paver accompanying device 210*b* align with the grooves of the paver accompanying device 210*c* such that a set of continuous grooves are created between both the paver accompanying device 210*b* and 210*c*. The same alignment is also illustrated with respect to the paver accompanying devices 210*a* and 210*d*.

In some embodiments, the brackets 240 may support the junction of one set of grooves to an adjacent set of grooves. For example, as explained above with respect to FIG. 2B, the brackets 240 may span between the pedestals 230 in a direction perpendicular to the direction the heat producing cable 260 may run (e.g., perpendicular to the direction of the grooves). Brackets 240 at such junctures may prevent or mitigate separation, bending, pinching, or other deformation of the paver accompanying devices 210 and/or the heat producing cable 260 at the juncture between two adjacent paver accompanying devices 210.

Figure 2D:
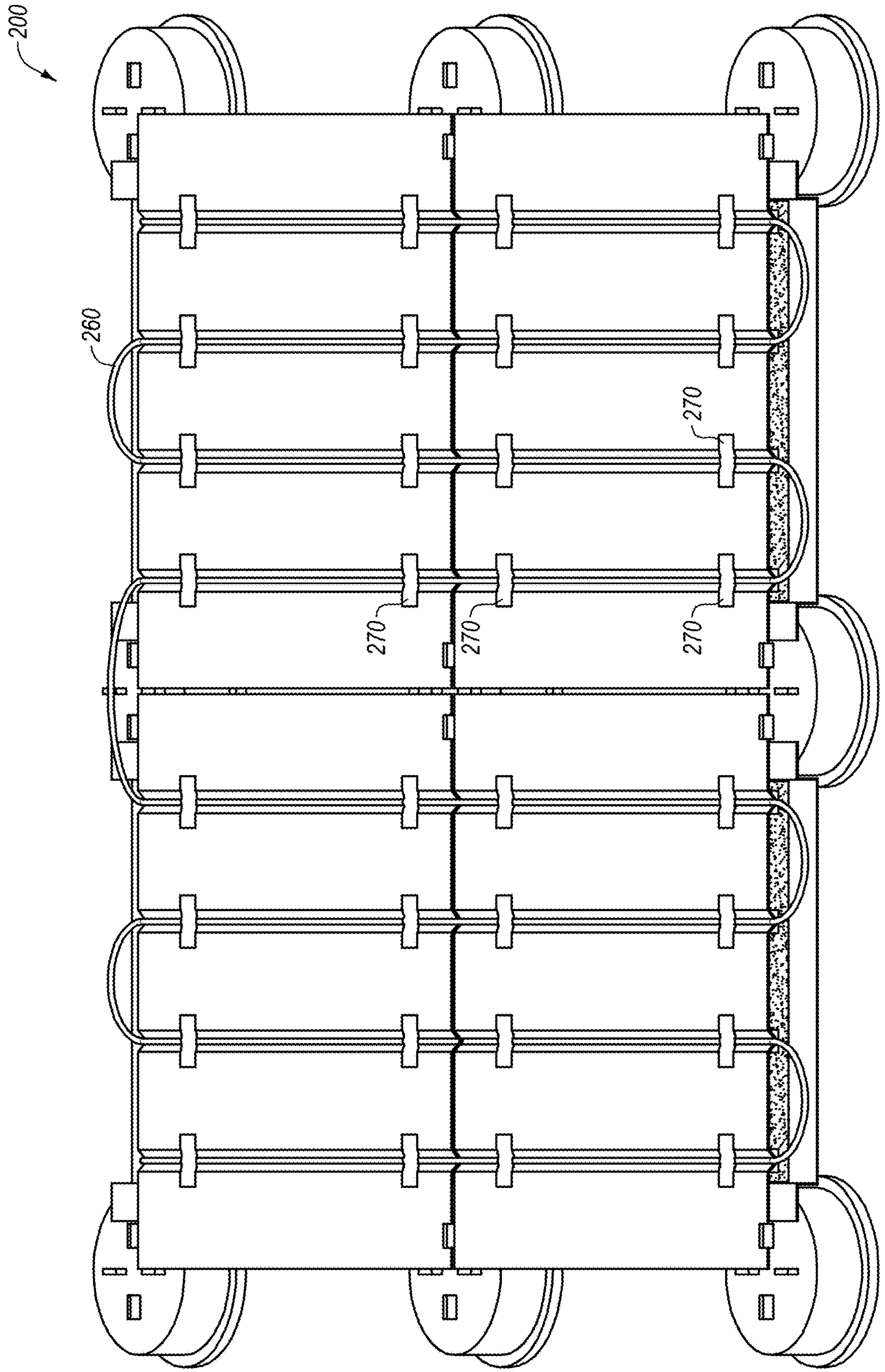

As illustrated in FIG. 2D, the heat producing cable 260 may be disposed within the grooves of the paver accompanying devices 210. For example, the heat producing cable 260 may be run along one length of the adjacent paver accompanying devices 210 in a first groove and then curved to the next adjacent groove to run the length of the adjacent paver accompanying devices 210 in the other direction. In these and other embodiments, the heat producing cable 260 may be maintained in the grooves through the use of an adhesive 270. The adhesive 270 may include any adhesive configured to maintain the heat producing cable in the grooves, even if only temporarily. For example, a glue or epoxy that degrades over time or that breaks down when exposed to heat or to fluid may be used such that the adhesive 270 deteriorates after the pavers 220 have been placed on top of the paver accompanying devices 210. The adhesive 270 may include a tape that may be thermally conductive, such as an aluminum tape. In some embodiments, the adhesive 270 may include any attachment (e.g., metallic notches, tabs, flaps, etc. cut into the plate at, near, or otherwise associated with the grooves) that may be bent, moved, or otherwise disposed over the heat producing cable 260 to secure the heat producing cable 260 in place.

In some embodiments, the heat producing cable 260 may be a single length of cable that extends to cover an entire region covered with pavers 220, such as an entire patio, courtyard, deck, terrace, etc.

Figure 2E:
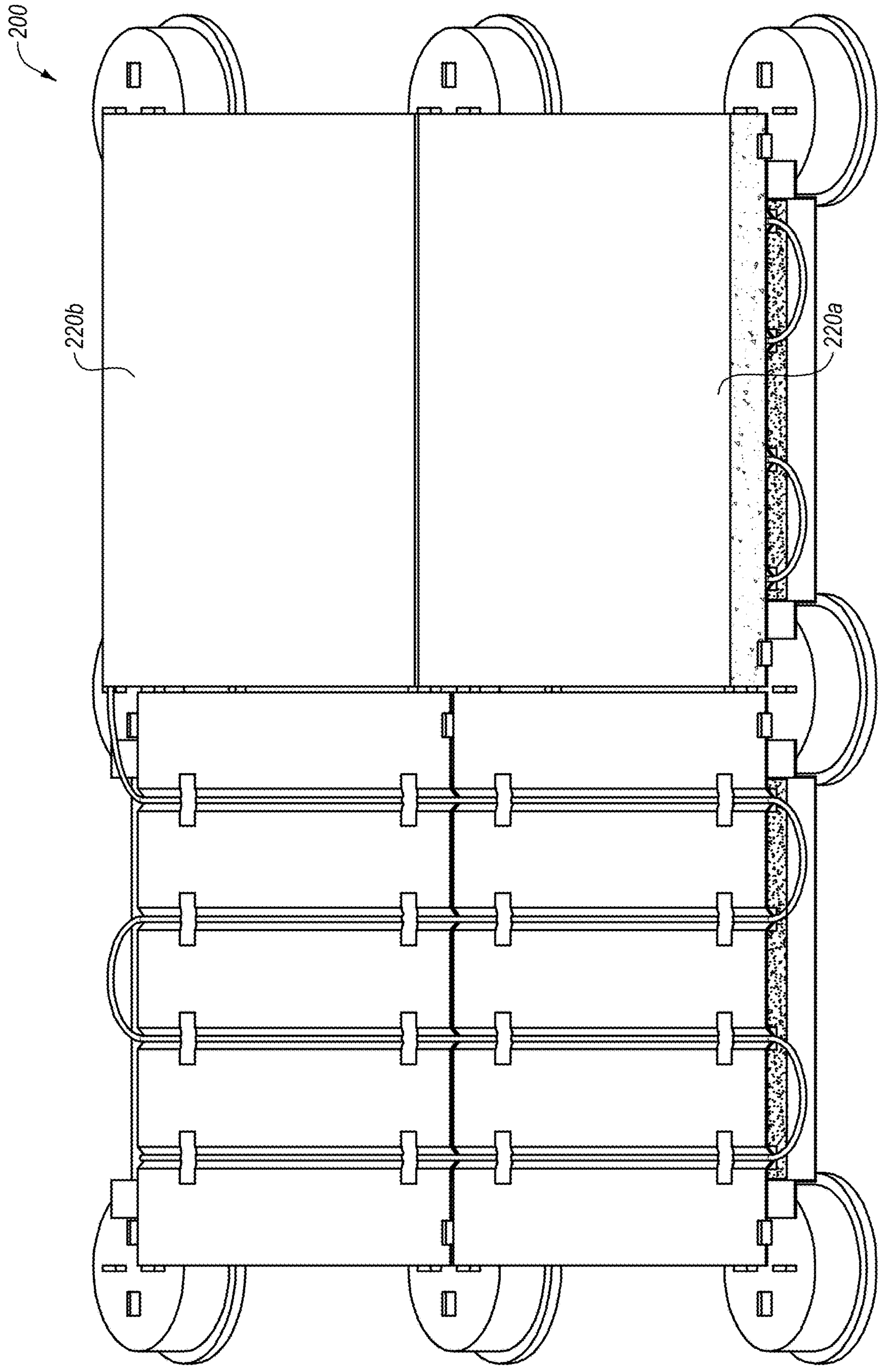
Figure 2F:
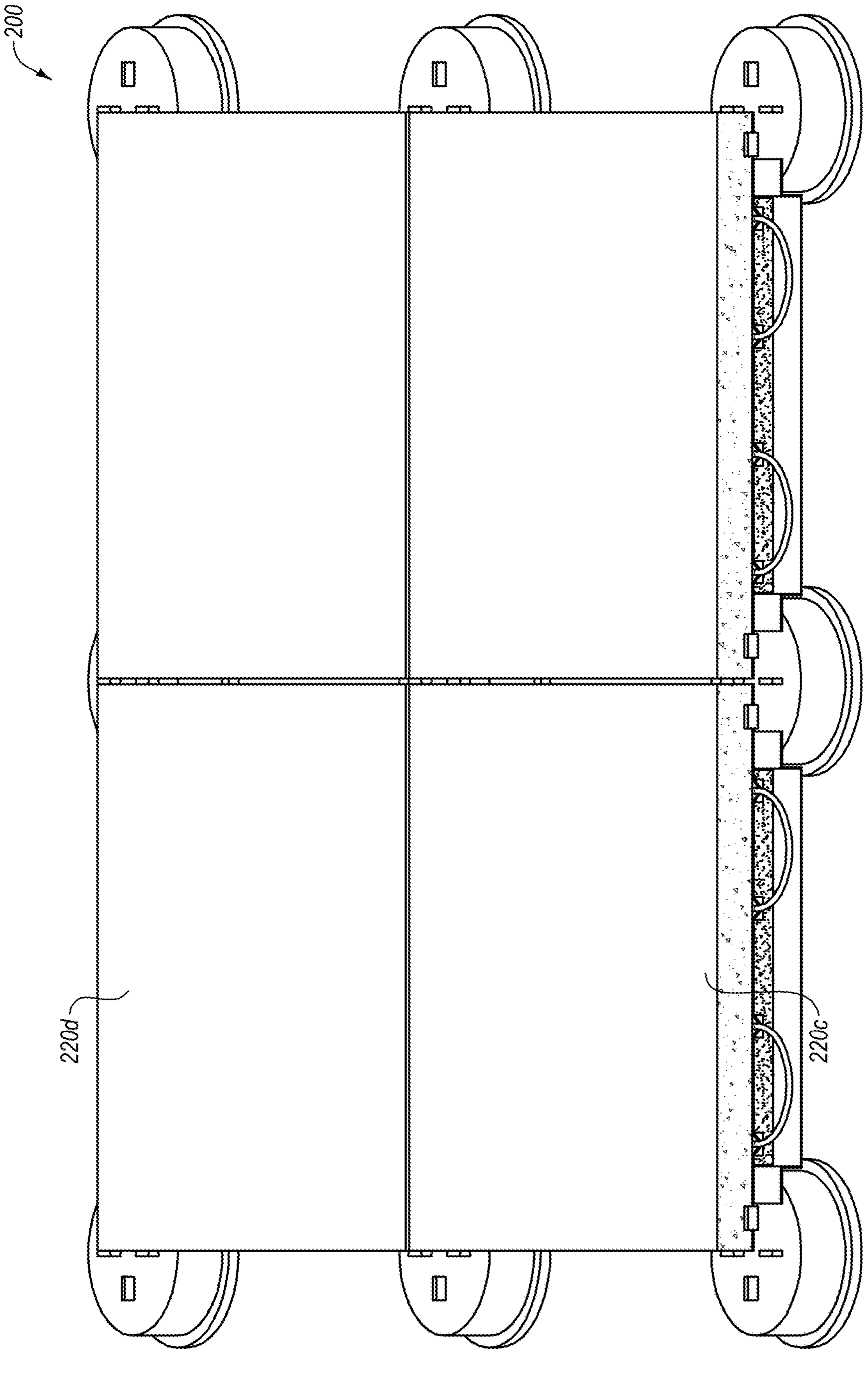

As illustrated in FIGS. 2E and 2F, the pavers 220 (e.g., 220*a* and 220*b* in FIG. 2E and 220*c* and 220*d* in FIG. 2F) may be placed on top of the paver accompanying devices 210 and/or the pedestals 230. The pavers 220 may be placed in a manner to create a generally level surface. In some embodiments, there may be a gap of less than one half of an inch between the pavers 220. In these and other embodiments, the pavers 220 may be positioned to keep the heat producing cable 260 within the grooves. For example, the pavers 220 may be flush with top faces of the paver accompanying devices 210.

Modifications, additions, or omissions may be made to FIGS. 2A-2F without departing from the scope of the present disclosure. For example, the paver heating system 200 may include more or fewer elements than those illustrated or described in the present disclosure. For example, the paver heating system 200 may include any number of paver accompanying devices 210, pavers 220, pedestals 230, brackets 240, and/or heat producing cables 260. As another example, the pedestals 230 may be positioned or numbered in any manner suitable for supporting the pavers 220 and/or the paver accompanying devices 210.

FIG. 3A illustrates an example paver accompanying device 310*a* and an example bracket 340*a*, in accordance with one or more embodiments of the present disclosure. The paver accompanying device 310*a* may include a plate 311*a* and grooves 312 (e.g., the grooves 312*a*-312*d*). The plate 311*a* may include a top face 314*a* and a bottom face 316*b*. The paver accompanying device 310*a* may also include insulation material 350*a*.

As illustrated in FIG. 3A, the grooves 312*a-d* of the paver accompanying device 310*a* may be spaced approximately evenly across the plate 311*a*. In some embodiments, the grooves 312*a-d* may be approximately uniformly shaped and/or spaced. For example, each of the grooves 312*a-d* may be approximately one inch across and one half of an inch deep with a generally "V" shaped profile. The grooves 312*a-d* may also be formed in other sizes and/or shapes (e.g., sized larger to accommodate a fluid flow tube, or in a "U" shaped profile as illustrated in FIG. 3B).

In some embodiments, the insulation material 350*a* may be adhered or otherwise attached to the bottom face 316*a* of the plate 311*a*. For example, the insulation material 350*a* may be sprayed on or an adhesive may be used to adhere the insulation material 350*a* to the bottom face 316*a* of the plate

311*a*. In these and other embodiments, the insulation material 350*a* may cover one, all, or some of the grooves 312*a-d*. For example, as illustrated in FIG. 3A, there may be insulation material 350*a* around all of the grooves 312*a-d*. The insulation material 350*a* may be on the bottom face 316*a* such that heat drawn in by the plate 311*a* may be radiated outward from the top face 314*a* more than from the bottom face 316*a*.

The grooves 312*a-d* (e.g., the groove 312*a*) may be sized and/or shaped to receive the heat producing cable 360. In some embodiments, the groove 312*a* may be sized to accommodate the heat producing cable 360 completely below the top face 314*a* of the plate 311*a*. For example, the dashed line illustrated in FIG. 3A across the groove 312*a* illustrates that the heat producing cable 360 may be completely below the top face 314*a* of the plate 311*a*.

In some embodiments, the bracket 340*a* may be sized and/or shaped to closely follow the insulation material 350*a*. For example, as illustrated in FIG. 3A, the insulation material 350*a* follows a generally rectangular shape, and the bracket 340*a* follows the same general shape. In these and other embodiments, the bracket 340*a* may be sized and/or shaped to provide support to the paver accompanying device 310*a*, for example, by supporting the insulation material 350*a*.

FIG. 3B illustrates another example paver accompanying device 310*b* and another example bracket 340*b*. FIG. 3B may be similar to FIG. 3A, illustrating an alternative profile of the grooves 312, insulation material 350*b*, and/or bracket 340*b*. The paver accompanying device 310*b* may be similar or comparable to the paver accompanying device 310*a*, the plate 311*b* may be similar to the plate 311*a*, the grooves 312*w*-312*z* may be similar or comparable to the grooves 312*a*-312*d*, the top face 314*b* may be similar to the top face 314*a*, the bottom face 316*b* may be similar to the bottom face 316*a*, the bracket 340*b* may be similar to the bracket 340*a*, and the insulation material 350*b* may be similar to the insulation material 350*a*.

As illustrated in FIG. 3B, the grooves 312*w*-312*z* may include a generally "U" shaped profile. In these and other embodiments, the insulation material 350*b* may follow the general profile of the grooves 312*w-z*. Additionally or alternatively, the insulation material 350*b* may have a curved profile proximate the bracket 340*b* that may facilitate guiding the insulation material 350*b* into the bracket 340*b* during assembly.

The profiles of the grooves 312*a-d* and 312*w-z*, the brackets 340*a* and 340*b*, and/or the insulation material 350*a* and 350*b* may be examples of such profiles, and any other shape or profile may be taken that may accommodate a heat generating cable and/or facilitate radiation of heat towards a paver and/or facilitate installation or assembly of a paver heating system.

Modifications, additions, or omissions may be made to FIGS. 3A and 3B without departing from the scope of the present disclosure. For example, the paver accompanying devices 310*a* and 310*b* and/or the brackets 340*a* and 340*b* may include more or fewer elements than those illustrated or described in the present disclosure. As another example, the grooves 312*a-d* and 312*w-z* may take any profile, including a rectangular, square, wavy, etc. profile.

Figure 4:
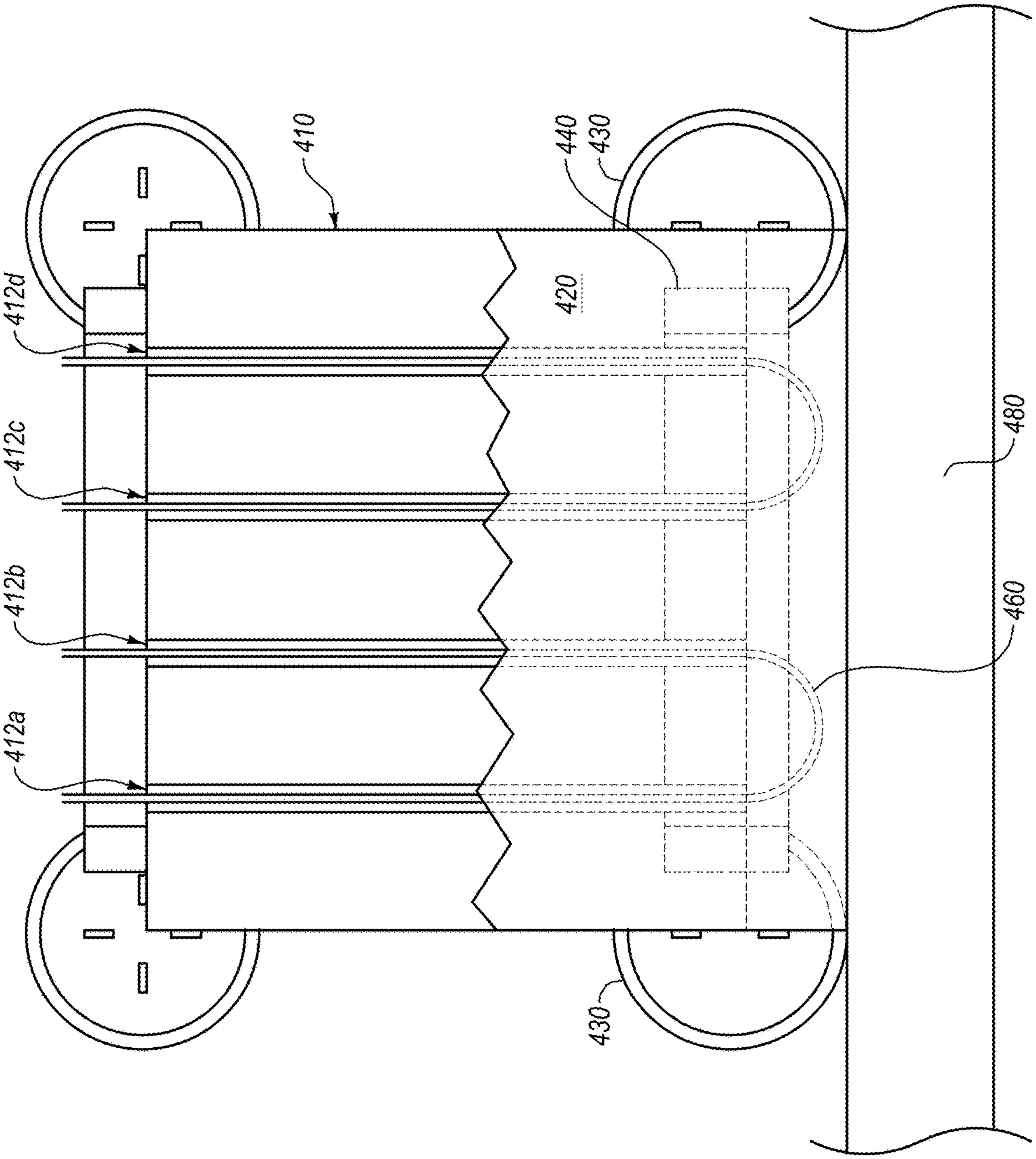
FIG. 4 illustrates another example paver heating system installed proximate a wall.

FIG. 4 illustrates another example paver heating system 400 installed proximate a wall 480, in accordance with one or more embodiments of the present disclosure. The paver heating system 400 may include pedestals 430, a bracket 440, a paver accompanying device 410, a heat producing cable 460, and a paver 420 (visually cut away along the zig-zag line for convenience in observing the illustration).

As illustrated in FIG. 4, the pedestals 430 may be positioned directly adjacent the wall 480 and shaped and/or designed to support a corner of a paver proximate the wall 480. In these and other embodiments, the heat producing cable 460 may turn from one groove 412 to the next groove 412 before reaching the wall 480. For example, the paver accompanying device 410 may not extend all the way to the wall 480, leaving a gap in which the heat producing cable 460 may turn from the groove 412*a* to the groove 412*b*, and from the groove 412*c* to the groove 412*d*.

Modifications, additions, or omissions may be made to FIG. 4 without departing from the scope of the present disclosure. For example, the paver heating system 400 may include more or fewer elements than those illustrated or described in the present disclosure.

Figure 5A:
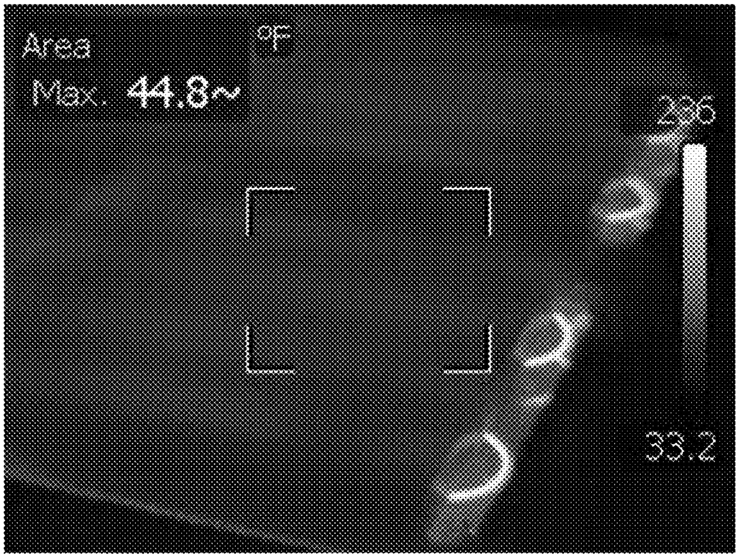
FIGS. 5A-5F illustrate heat measuring views of an example paver heating system in various circumstances.
Figure 5B:
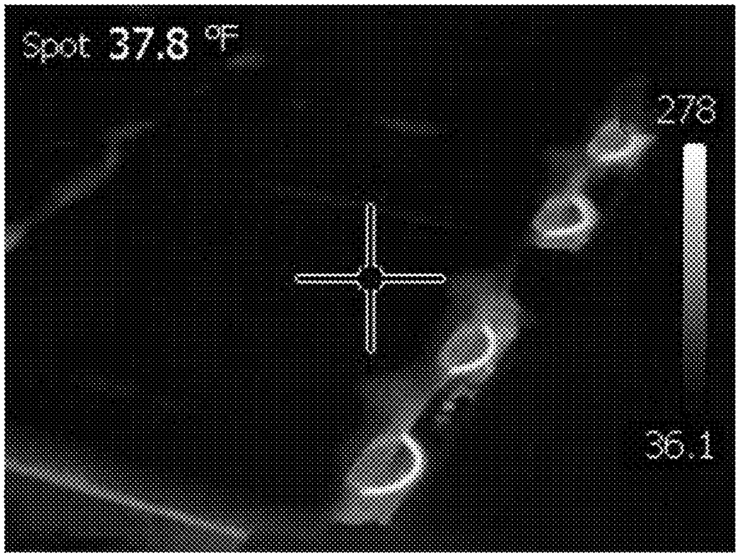

FIGS. 5A-5F illustrate heat measuring views of an example paver heating system in various circumstances using an infrared sensor, in accordance with one or more embodiments of the present disclosure. In each of FIGS. 5A-5F, a scale bar on the right designates the range of temperatures in ° F., and the reading in the top right is either measured at the point in the crosshairs (FIGS. 5B-5F) or is the maximum temperature in the bracketed area (FIG. 5A). FIGS. 5A and 5B are from approximately the same first point in time with approximately the same ground temperature of slightly above freezing (e.g., approximately 33 to 36° F.). FIGS. 5C-5F are from approximately the same second point in time with approximately the same ground temperature of below freezing (e.g., approximately 18 to 23° F.). FIGS. 5A-5F may illustrate the example paver heating system in operation and example temperature ranges within which the paver heating system may operate.

As illustrated in FIG. 5A, despite the high temperature of the heat producing coil, the surface of the pavers did not exceed 50° F. As illustrated in FIG. 5B, the temperature at the surface of the pavers was above freezing, or 32° F., but did not exceed 50° F. even when the surrounding area was also above freezing.

Figure 5C:
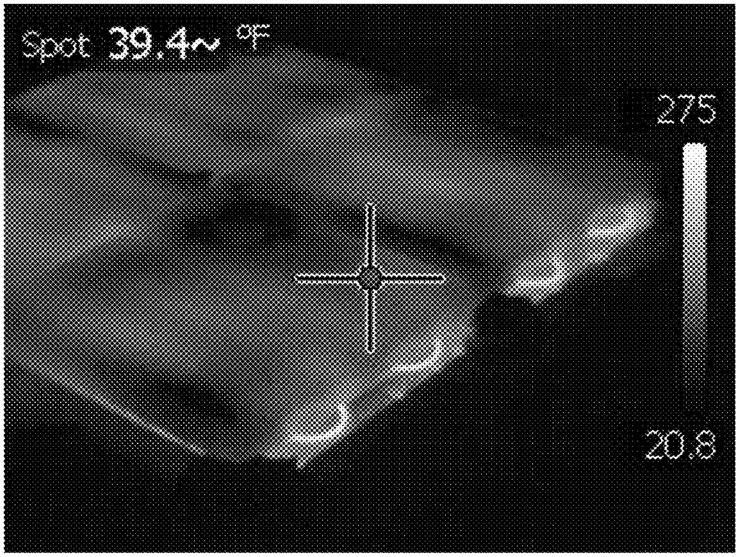
Figure 5D:
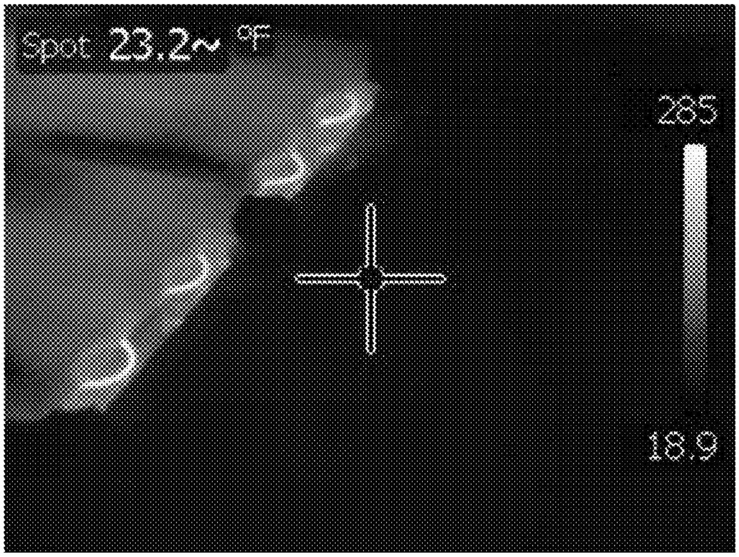
Figure 5E:
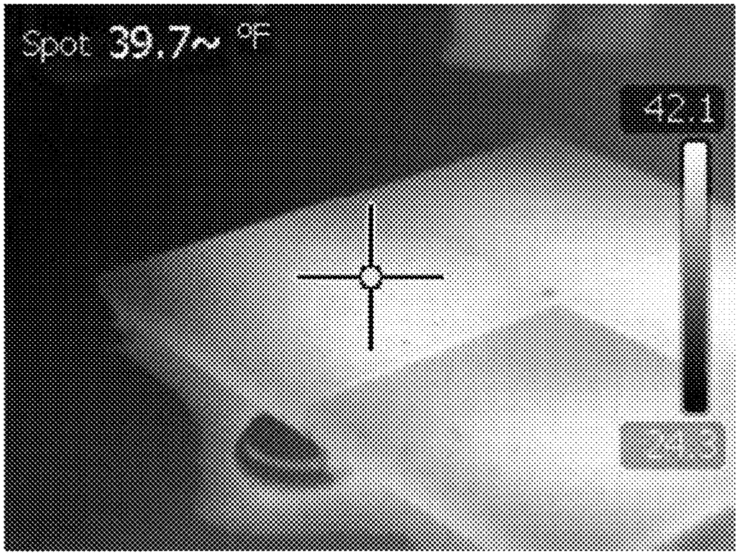
Figure 5F:
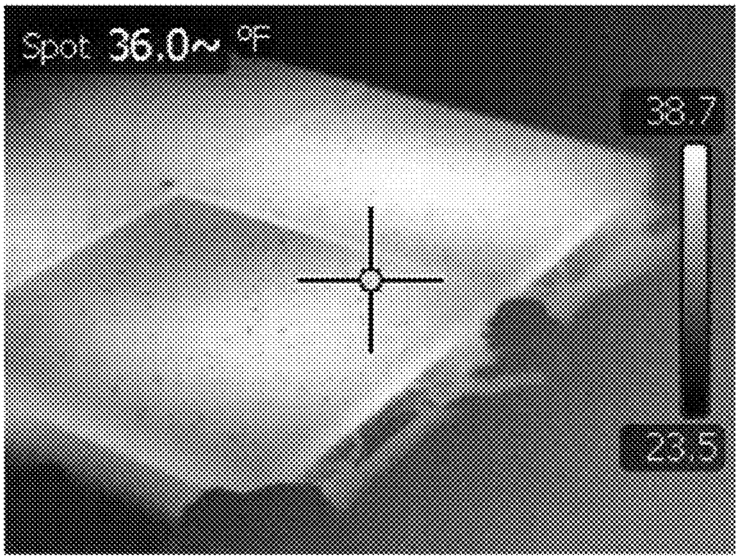

As illustrated in FIG. 5C, when the temperature of the surrounding ground was approximately 20° F., the surface of the pavers at the measured crosshairs was about 39° F., between 32° F. and 50° F. As illustrated in FIG. 5D, the measured temperature of the surrounding ground was approximately 23° F. As illustrated in FIGS. 5E and 5F, with the coils turned off, the temperature at the surface of the pavers was between approximately 36° F. and 42° F., which may be above freezing and below 50° F. In these and other embodiments, the temperature at the surface of the pavers may be maintained approximately below 50° F. and above 32° F. Additionally or alternatively, the temperature may be maintained between approximately 43° F. and 32° F.

In some embodiments, the example paver heating system may only operate the heat producing cable in certain circumstances, or a certain combination of circumstances. For example, the heat producing cable may turn on if an ambient temperature is below 40° F. In these and other embodiments, if the ambient temperature and/or the ground temperature is above 50° F., the surface temperature of the pavers may follow the ambient temperature above 50° F. Thus, when described as maintaining a temperature using the heat producing cable, it will be appreciated that such a description is to maintain the temperature against cold, not against warmth. In other words, temperatures may rise with ambient temperature rising, but the example paver heating system may facilitate maintaining temperatures above freezing when icy or snowy conditions exist.

In some embodiments, the example paver heating system may include a temperature probe or other sensor for detecting temperature changes, humidity changes, precipitation, etc. The temperature probe may be coupled to a control system that may direct or otherwise control the operation of the example paver heating system. For example, if the temperature probe detects that the ambient temperature has dropped below a certain threshold, the example paver heating system may turn on at a first wattage, and if a second threshold is passed, the example paver heating system may increase the power to a second wattage for the heat producing cable.

In some embodiments, the temperature operating ranges may be varied based on the environment in which they are used and the desired purpose of the paver heating system. For example, the watt density of the heat cable design may increase the heat output per lineal foot of the heat producing cable. Additionally or alternatively, the square foot heat density may be varied by changing the spacing of the grooves on the plates. As another example, the temperature range and properties may be varied by changing the insulation material, the thickness of insulation, etc. In some embodiments, any of a combination of the above-mentioned factors may be utilized and modified (potentially including the control system and/or temperature probe) such that the paver heating system maintains the temperature at the surface of the pavers above freezing (32° F.) and below 120° F., above 32° F. and below 100° F., above 32° F. and below 70° F., above 32° F. and below 50° F., above 25° F. and below 50° F., etc. Similar temperature ranges may also be maintained and/or applicable to a ground surface below the pavers.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A paver heating system comprising:

a plate having a plurality of grooves in a top face of the plate, the plurality of grooves running from a first end of the plate to a second end of the plate and open at the first end of the plate and the second end of the plate, the plurality of grooves sized to hold a resistive-heat cable within the plurality of grooves such that the resistive-heat cable is disposed even with or below the top face of the plate; and a bracket shaped to span between two pedestals and suspended between the two pedestals, the bracket shaped to support the plate, the bracket sized to be suspended between the two pedestals when the pedestals are spaced to support a paver at two opposing ends of the paver, the bracket comprising:

a first portion at a first end of the bracket, the first portion shaped to rest on a first pedestal of the two pedestals and be parallel or approximately parallel with the plate;

a second portion extending downwards away from the first portion and extending at least a depth of the grooves;

a third portion spanning away from the second portion towards a second pedestal of the two pedestals when the pedestals are spaced to support the paver, the third portion parallel or approximately parallel with the plate;

a fourth portion extending upwards from the third portion towards a top of the second pedestal of the two pedestals; and a fifth portion at a second end of the bracket, the fifth portion shaped to rest on the second pedestal of the two pedestals and parallel or approximately parallel with the plate.

2. The paver heating system of claim 1, wherein the plate is positioned adjacent a second plate such that the plurality of grooves in the plate align with a second plurality of grooves in the second plate to create a set of continuous grooves across the plate and the second plate.

3. The paver heating system of claim 1, wherein a portion of the resistive- heat cable is disposed beyond the plate and curves from one of the plurality of grooves to another of the plurality of grooves.

4. The paver heating system of claim 1, wherein the bracket is shaped and positioned to support the plate and at least one other plate.

5. The paver heating system of claim 1, further comprising an adhesive to keep a portion of the resistive-heat cable approximately below the top face of the plate.

6. The paver heating system of claim 5, wherein the adhesive includes a metallic attachment.

7. The paver heating system of claim 6, wherein the metallic attachment includes one or more tabs cut into one of the plate proximate at least one of the plurality of grooves.

8. The paver heating system of claim 1, further comprising insulation material adhered to a back face of the plate, the insulation material supported by the bracket.

9. The paver heating system of claim 8, wherein the insulation material is around each of the plurality of grooves.

10. The paver heating system of claim 8, wherein the insulation material includes a squared off shape and the bracket includes a corresponding shape.

11. The paver heating system of claim 8, further comprising a heat tolerant adhesive to adhere the insulation material to the back face of the plate.

12. The paver heating system of claim 1, wherein the plurality of grooves are spaced approximately equally across the top face of the plate.

13. The paver heating system of claim 1, wherein the plate is approximately two feet long.

14. The paver heating system of claim 1, wherein the plurality of grooves extend approximately one half of an inch below the top face of the plate.

15. The paver heating system of claim 1, wherein at least one of the plurality of grooves has one of a generally "U" shaped profile or a generally "V" shaped profile.

16. The paver heating system of claim 1, wherein the resistive-heat cable is selected to maintain a temperature at a top surface of a paver resting atop the plate at or above approximately 33° F.

17. The paver heating system of claim 1, wherein the resistive-heat cable is selected to maintain a temperature proximate a base of the first of the two pedestals at or above approximately 33° F.

18. The paver heating system of claim 1, wherein the plate is sized to be smaller than the paver by 10% or less.

19. The paver heating system of claim 1, further comprising the resistive- heat cable, wherein the resistive-heat cable includes:

a resistive element including at least one of nichrome, cupronickel, an iron-chromium- aluminum alloy, copper, or bronze;

an insulator around the resistive element, the insulator including at least one of fiberglass, a mineral-based insulation, a polymer-based insulation, fluoropolymer, polyvinyl chloride, polyolefin, or polyethylene;

a metallic enclosure around the insulator; and a protective jacket around the metallic enclosure.

20. The paver heating system of claim 1, wherein the plate is sized to cover a portion of the first of the two pedestals without interference between the plurality of grooves and the first of the two pedestals.

* * * * *